United States Patent
Golestani (10) Patent No.: US 6,965,943 B1
(45) Date of Patent: Nov. 15, 2005

(54) END-TO-END INTERNET CONTROL (75) Inventor: S. Jamaloddin Golestani, Berkeley Heights, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/327,347

(22) Filed: Jun. 5, 1999

(51) Int. Cl.[7] .............................. G06F 15/16
(52) U.S. Cl. ............ 709/235; 709/231; 709/232; 709/233; 709/234; 370/232; 370/233; 370/234; 370/235; 370/236; 370/237; 370/238
(58) Field of Search ................ 709/231–238, 709/252–258, 468; 370/231–238, 468

(56) References Cited

U.S. PATENT DOCUMENTS

| | | | |
|---|---|---|---|
| 5,748,901 A | * | 5/1998 | Afek et al. ............... 707/228 |
| 5,844,886 A | * | 12/1998 | Szentesi ................... 370/230 |
| 5,968,128 A | * | 10/1999 | Lauck et al. .............. 709/232 |
| 6,331,986 B1 | * | 12/2001 | Mitra et al. ............... 370/468 |

* cited by examiner

Primary Examiner—Kamini Shah
Assistant Examiner—Hieu Le (57) ABSTRACT

In a class of minimum cost flow control (MCFC) algorithms for adjusting session rates or window sizes congestion control is achieved through consideration of an incremental cost function that addresses link congestion, and an incremental cost function that addresses the cost of providing less than the desired transmission rate. A coarse version of the algorithm is geared towards implementation in the current Internet, relying on the end-to-end packet loss observations as indication of congestion. A more complete version anticipates an Internet where sessions can solicit explicit congestion information through a concise probing mechanism.

35 Claims, 2 Drawing Sheets

- 10: SET INITIAL RATE, $r_s = r^{init}$
- 11: CONTINUE TRANSMISSION OF PACKETS SUBJECT TO THE ALLOWABLE MAXIMUM RATE $r_s$
- 12: EVALUATE CONGESTION MEASURE $\gamma_s(f)$
- 13: EVALUATE ATTAINED RATE $\tilde{r}_s$
- 14: UPDATE RATE $r_s$

END-TO-END INTERNET CONTROL

BACKGROUND OF THE INVENTION

This invention relates to congestion control in networks and, more particularly, to congestion control in the Internet.

Congestion control in packet networks has proven to be a difficult problem, generally. In the Internet, however, this problem is particularly challenging, due to the very limited observability and controllability of the network. In order to accommodate rapid growth and proliferation, the design of the IP protocol and the requirements placed on individual subnetworks have been kept to a minimum. Consequently, the main form of congestion control possible in the current Internet is end-to-end control of user traffic at the transport layer. As exemplified by TCP, this control must be exerted using only the limited network observation that sessions can make locally, based on their own performance. The prevalent form of service discipline in the Internet is FIFO queueing, and control approaches that are based on more sophisticated service disciplines are not easily applicable.

Although the current TCP congestion control has been relatively successful, its ability to optimally control congestion is exceedingly stretched by the rapid growth of the Internet and the proliferation of both real-time and multicast services. Over the past several years, considerable effort has been directed at improving the existing techniques of congestion control in the Internet and at introducing new approaches to accommodate the requirements of new services and applications. For example, methods of enforcing fairness or user priorities have been extensively studied in recent years. They are usually based on non-FIFO service scheduling at network switches, where traffic streams meet and competition for resources arises. Also, methods for network congestion control based on optimization techniques have been studied which use distributed computations. However, algorithms proposed for this purpose require sophisticated network layer protocols; which is a luxury that is not available in the Internet for end-to-end congestion control.

What is needed is a method for optimizing network usage without resort to sophisticated network layer protocols.

SUMMARY

The problems found in the prior art are overcome, and an advance is achieved by treating the end-to-end congestion control as a global optimization problem. A class of minimum cost flow control (MCFC) algorithms for adjusting session rates or window sizes is accordingly disclosed where congestion control is achieved through consideration of cost function that addresses link congestion, and cost function that addresses the cost of providing less than the desired transmission rate. Significantly, these algorithms can be implemented at the transport layer of an IP network and can provide certain fairness properties and user priority options without requiring non-FIFO switches.

A coarse version of the algorithm is geared towards implementation in the current Internet, relying on the end-to-end packet loss observations as indication of congestion. A more complete version anticipates an Internet where sessions can solicit explicit congestion information through a concise probing mechanism.

DETAILED DESCRIPTION

The dynamics of a network congestion control strategy can span multiple time scales. On the fastest time scale, congestion control provides protection against sudden surges of traffic by quick reaction to buffer overloads. The reaction time in this type of control is, at best, on the order of one round-trip delay, since that is how fast news of congestion can reach a source node and the response to it propagate back to the trouble spot. On a slower time scale, congestion control could mean gradual but steadier reaction to the build-up of congestion, as perceived over a period involving tens, or hundreds, of round-trip times. It is on this time scale that notions such as the average transmission rate of a session, rate allocation, and fairness become meaningful. This disclosure addresses itself to this quasi-static congestion control, where the control time scale is the "medium-term" tens, or hundreds, of round trip times.

A window scheme for end-to-end congestion control employs an arrangement whereby the amount of outstanding data for a given session is limited to a maximum number of packets. This number is referred to as the window size. In such an arrangement, a transmitting device feels free to keep sending packets, as long as the number of outstanding packets is less than the window size. Outstanding packets are packets that were sent to a destination, for which an acknowledgement was not yet received and no information is available to indicate that the packets were lost. When the number of outstanding packets reaches the maximum, transmission of packets is halted.

Any particular session can, of course, control its window size and can, therefore, change its window size in response to changing network conditions. Thus, when it is determined by a party in control of a session that, for a given window size, no congestion occurs for the session (i.e., no packets are lost), the party might increase the window size and, thereby, effectively increase the rate of transmission. In TCP protocol, this dynamic control of window size is undertaken in a conservative manner. That is, for each packet that is transmitted successfully without a loss, the window size is increased only slightly. Conversely, for each loss of a packet, the window size is reduced significantly (e.g. to half its value). In this manner, the window size keeps changing, in a saw-tooth fashion, while adjusting itself to the capacity of the network.

It should be noted that for any fixed window size, as the network becomes congested and the round trip delay increases, the transmission rate is concomitantly reduced. This reaction takes place within one round trip delay; i.e. it is a short-term operation. Thus, the window scheme provides a form of dynamic congestion control even if the window size is not adjusted according to network conditions. If modifying the window size in response to quasi-static network conditions is permitted, then the window scheme combines dynamic and quasi-static congestion control. In such an arrangement, the window size can be set to the product of the medium-term average rate, $r_s$, and the medium term average round trip delay, $\tau_s$; i.e., $w_s = r_s \cdot \tau_s$.

The congestion control method disclosed herein performs global optimization in the network. That is, while the method contemplates that each session would control its own transmission parameters, the optimization is global, over all sessions that are active in the network. The disclosed method also contemplates no exchange of information between the sessions, and no central network measurement or control. As explained in more detail below, the global optimization is realized by distributed participation, by each session undertaking to execute an iterative algorithm. At least part of the method is performed by the receiving end apparatus of each session. Information about the recommended window size, or rate of transmission, is then communicated to the transmitting end apparatus of the session through a feedback path that is part of another session (from the receiving end apparatus serving as the transmitting end apparatus of this other session). More specifically, the receiving end develops a recommendation of the optimum window size or transmission rate and transmits that to the transmitting end. Alternatively, the receiving end develops information that it transmits to the transmitting end, and the recommended window size or transmission rate is developed locally at the transmitting end from that information.

The above discussion about window sizes might lead one to believe that the global optimization method disclosed herein is suitable for window-size optimization. That is correct, but actually, the method disclosed herein is suitable for both window size optimization and average transmission rate optimization. In the following discussion, optimization of transmission rate is presented, but it should be realized and understood that, based on the aforementioned relationship between window size and transmission rate, window size optimization is easily derivable.

Figure 1:
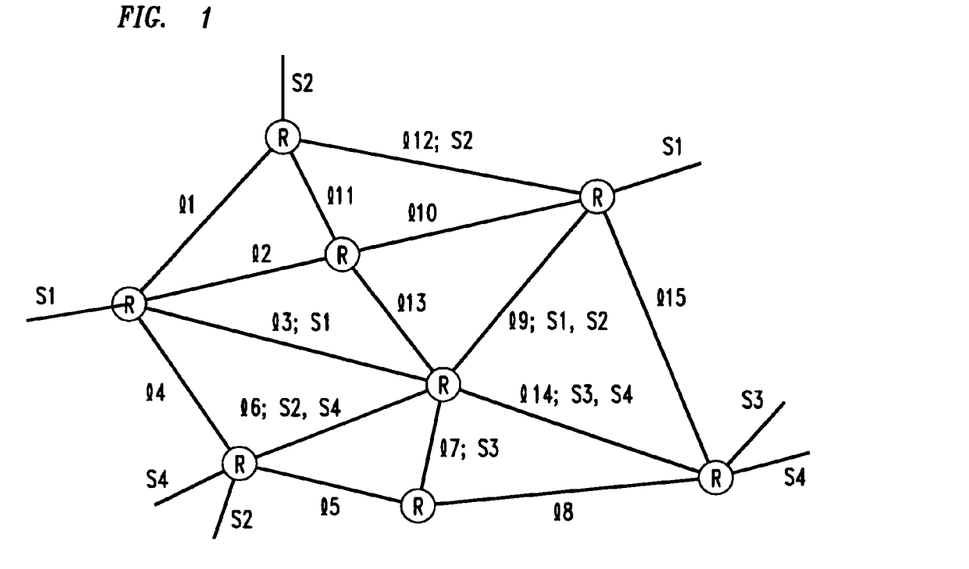
FIG. 1 shows a packet network with a plurality of switching or routing nodes with links that interconnect the nodes, and a number of sessions that utilize the network.

In the equations that follow, the communication links are denoted by index $l=1, \ldots, L$, and the network sessions are denoted by index $s=1, \ldots, S$. A session corresponds to a one way flow of traffic between a source and a destination. The return traffic, which is effectively the feedback to the source, constitutes another session. The medium-term average packet transmission rate is denoted by $r_s$, the medium-term average rate of traffic through link $l$ is denoted by $f^l$, and the vectors r and f represent $r \equiv (r_1, r_2, \ldots r_s)$ and $f \equiv (f^1, f^2, \ldots f^L)$, respectively. This is illustrated in FIG. 1 with links 11 through 115 and sessions s1 through s4.

In accordance with the principles of this disclosure, the cost function to be minimized is constructed from the point of view of the hypothetical network services provider. The hypothetical network provider realizes that there is a cost when the network fails to allocate bandwidth to users who are willing to pay.

Figure 2:
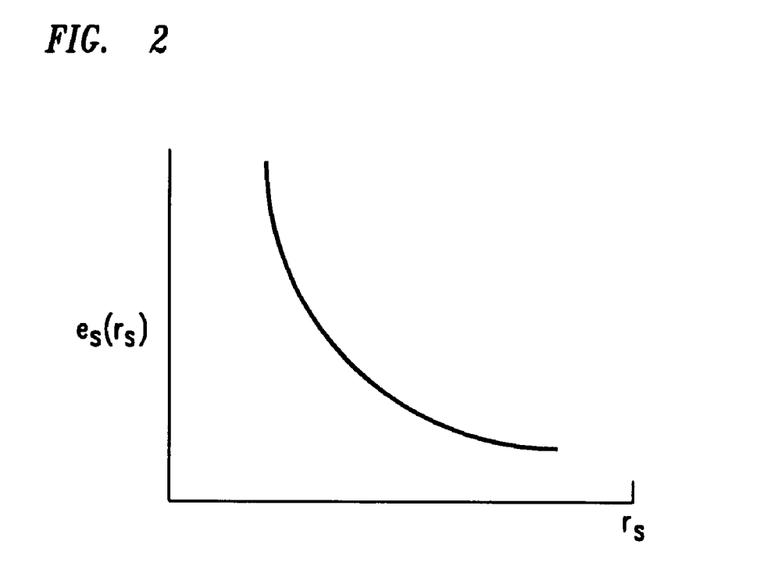
FIG. 2 illustrates a session cost function.
Figure 3:
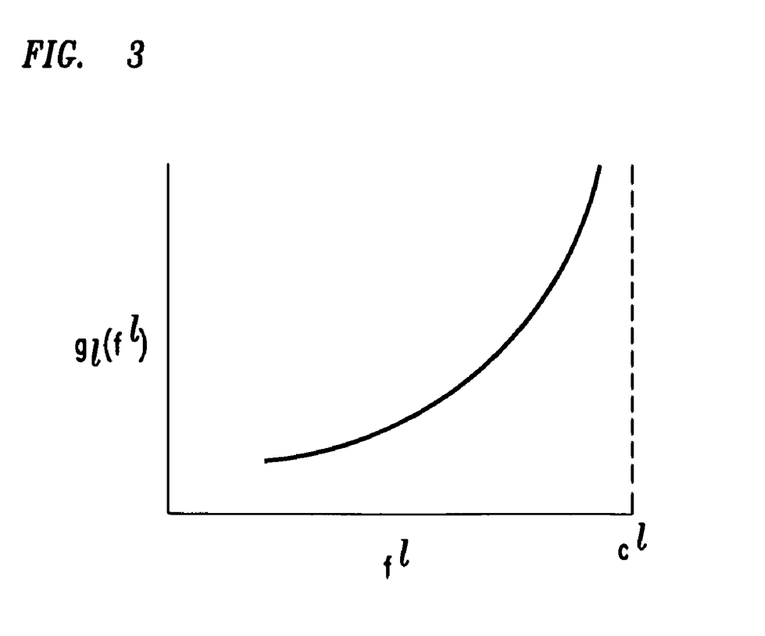
FIG. 3 illustrates a link congestion cost function.

Therefore, for each session s, a convex cost function $e_s$, is created that is a function of $r_s$. More particularly, the created cost function, $e_s$, is a decreasing function of the rate $r_s$, as exemplified by the curve of FIG. 2. What the curve of FIG. 2 effectively states is that as the offered, or available, average transmission rate, $r_s$, is decreased, the cost, in terms of user dissatisfaction or actual revenue lost, increases. The hypothetical network provider also realizes that there is a cost when bandwidth is allocated to a session but the session is unable to take advantage of the allocated bandwidth because of network congestion. Therefore, for each communication link l of the network, a convex cost function $g_l$ is created that is a function of $f^l$. This function increases with increased $f^l$, as exemplified by the curve of FIG. 3. What the curve of FIG. 3 states is that as the flow approaches the capacity of the link, l, the average queue length of messages waiting to traverse the link increases, and the danger of congestion obviously goes up.

A packet network can employ two types of routing: single path, and multipath. In single-path routing (such as the routing in the current Internet), the entirety of the traffic takes a given path. In multipath routing, a session's traffic may have different portions routed over different paths that lead to a given destination. Of course, the routing tables could be updated over time for both types of routing.

Considering first the more general, multipath, case, if $\phi^l_s$ is the fraction of traffic of s that is carried over link l, the flow in a given link is given by $$f^l = \sum_{s=1}^{S} \phi^l_s \cdot r_s, \, l = 1, 2, \ldots, L, \quad (1)$$

which simply says that the flow of each link is the sum of the fractions of flows of all sessions carried over it. It is assumed in equation (1) that the number of packets lost at link l is negligible, and it is also assumed that the time scale of routing updates is relatively long compared to the medium-term averaging time of the congestion control algorithm.

In accordance with this disclosure, network congestion control is based on the following global optimization relationship:

$$\min_r J(r) = \sum_{s=1}^{S} e_s(r_s) + \sum_{l=1}^{L} g_l(f^l), \quad (2)$$

subject to the condition that the rate allocated to each session is not less than zero and not more than the rate desired by each session. Note that since the session and the list cost functions are convex, $e_s'' \geq 0$ and $g_l''(f^l) \geq 0$.

While equation (2) provides an expression for a global cost function, it has already been stated that it is desired to have each session control its own rate. To that end, an incremental reward function, $h_s(r_s)$, is defined for session s by $$h_s(r_s) \equiv -e_s'(r_s), \, s=1, 2, \ldots, S, \quad (3)$$

where $r_s$ is the average transmission rate that is actually achieved by session s, and $e_s'$ is the derivative of the cost function, $e_s$; and a congestion measure function, $\gamma_s(f)$, is defined for session s by $$\gamma_s(f) \equiv \frac{\partial}{\partial r_s} \sum_{l=1}^{L} g_l(f^l) = \sum_{l=1}^{L} \phi^l_s \cdot g_l'(f^l), \quad (4)$$

where $f=(f^1, f^2, \ldots, f^L)$ is the link flow vector corresponding to $r_s$. Equation (3) provides a measure of the sensitivity of the cost function of the sessions to changes in the transmission rate. Equation (4) provides a measure of the sensitivity of the total cost of congestion to changes in the flow of traffic through the links that session s is employing. With these formulations, when cost functions $e_s$ and $g_l$ are such that $e_s'(r_s)<0$ and $g_l'(f^l)>0$, it can be shown that necessary and sufficient conditions to minimize equation (2) are:

$$h_s(r_s^*) \leq \gamma_s(f^*) \text{ if } r_s^*=0$$
$$h_s(r_s^*)=\gamma_s(f^*) \text{ if } 0<r_s^*<r_s^d \quad s=1, 2, \ldots, S, \quad (5)$$
$$h_s(r_s^*) \geq \gamma_s(f^*) \text{ if } r_s^* \geq r_s^d$$

where $r_s^*$ is the optimized rate, and $f^*$ is the flow vector when the sessions that contribute to the flow are at their optimized rate. Of course, for single-path routing, equation (4) reduces to $$\gamma_s(f) = \sum_{l \in P_s} g_l'(f^l), \quad (6)$$

where $P_s$ denoted the path of session s. Stated in simpler terms, the sum in equation (6) is taken over those links that carry the traffic of session s.

Interpretation of the equation (5) optimality condition is straight forward: at the optimal transmission rate, $r_s^*$, as long as the rate is not at the 0 and $r_s^d$ bounds, the session's incremental reward function is equal to the incremental measure of congestion. If $r_s^*$ cannot be decreased (increased), then the session's incremental reward function may be smaller (larger) than the session's congestion measure.

Since the conditions in the network are not stationary, and there is no knowledge of the behavior of other sessions, the optimization problem of equation (2) cannot be solved in closed form even when the cost functions are expressed in closed form. However, the constrained optimization problem of equation (2) can be solved by means of a gradient projection algorithm where, with each iteration, from the current rate, $r_s$, we first derive an auxiliary parameter, $\hat{r}_s = r_s + \mu \cdot (h_s(r_s) - \gamma_s(f))$, where $\mu$ is a multiplicative step size coefficient. Then we update $r_s$ by:

$$r_s \leftarrow \hat{r}_s \text{ if } r_s^{init} \leq \hat{r}_s \leq r_s^d$$
$$r_s \leftarrow r_s^{init} \text{ if } \hat{r}_s \leq r_s^{init}$$
$$r_s \leftarrow r_s^d \text{ if } r_s^d \leq \hat{r}_s, \quad (7)$$

where $r_s^{init} \geq 0$.

When this algorithm is carried out by all of the sessions, it converges to the optimal point of equation (2), provided that the step size $\mu$ is chosen to be small enough. I call this algorithm the minimum cost flow control (MCFC) algorithm. Distributed execution of the iterations represented by equation (7) by various sessions in the network is possible if, prior to each iteration, the current values of congestion measures, $\gamma_s$, are available.

A priori knowledge of the desired session rates $r_s^d$ is not actually necessary for the execution of the MCFC algorithm. When updating session rates, the upper bound of $r_s$ can be simply disregarded, letting the course of action determine whether or not a session s is allocated its desired rate. In other words, the iteration represented by equation (7) can be replaced with the following equation, $$r_s \leftarrow \max(0, \tilde{r}_s + \mu(h_s(\tilde{r}_s) - \gamma_s(f))), \quad (8)$$

where $\tilde{r}_s$ is the average rate that is actually utilized by session s during the past iteration, as compared to the allocated rate, $r_s$. For sake of simplicity, the distinction between the allocated rate and the rate that is actually utilized is ignored in the equations that follow, leading to the equation $$r_s \leftarrow \max(0, r_s + \mu(h_s(r_s) - \gamma_s(f))). \quad (9)$$

This simplification is equivalent to assuming that sessions are always greedy, i.e., that they utilize whatever rate is allocated to them.

Figure 4:
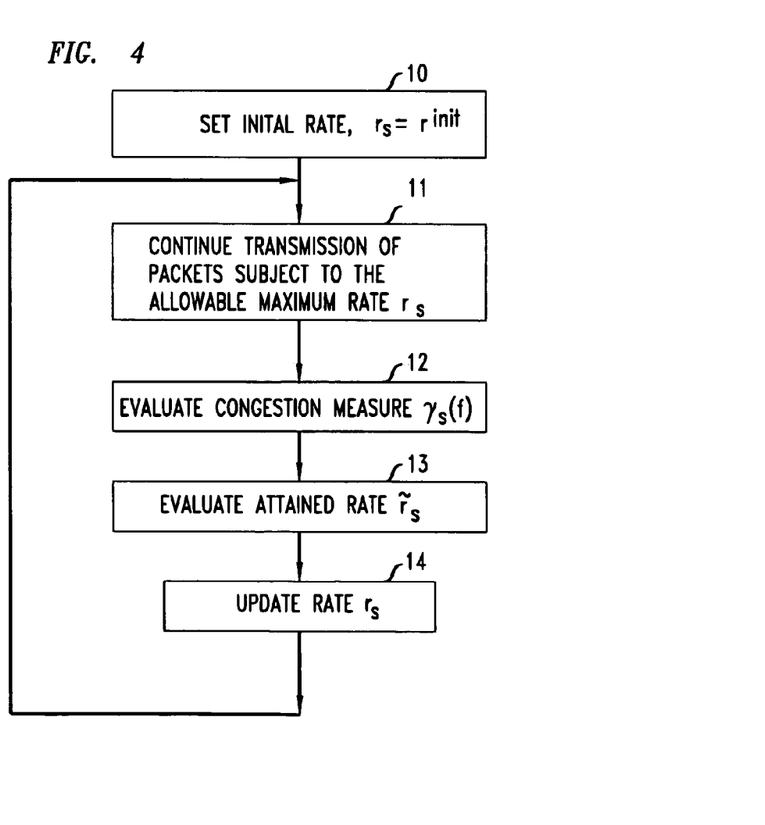
FIG. 4 presents a flow chart of the minimum cost flow control algorithm

The speed of convergence of the MCFC algorithm can be significantly improved by incorporating the second derivatives of the cost function in the evaluation performed in block 14; i.e., the replacement schema is:

$$r_s \leftarrow \max\left(0, r_s + \mu \frac{h_s(r_s) - \gamma_s(f)}{\Gamma_s(f) - h_s'(r_s)}\right) \quad (10)$$

where $$\Gamma_s(f) \equiv \frac{\partial^2}{\partial^2 r_s} \sum_{l=1}^{L} g_l(f^l) = \sum_{l=1}^{L} (\varphi_s^l)^2 \cdot g_s''(f^l). \quad (11)$$

In single-path routing, equation (11) reduces to $$\Gamma_s(f) = \sum_{l \in P_s} g_s''(f^l). \quad (12)$$

The precise form that functions $e_s$ and $g_s$ (and, consequently, $h_s$ and $\gamma_s$) take on is not necessarily critical (as long as the above-mentioned conditions are maintained), but it is useful to have a better appreciation for the effects of those functions. To that end, an incremental reward function of the form $$h_s = \left(\frac{\alpha_s}{r_s}\right)^{v_s} \quad (13)$$

is considered for some positive values of $\alpha_s$ and $v_s$. When at the optimum rate the medium-term average transmission rate is $r_s^*$ and $\gamma_s = h_s$, it follows that $$r_s^* = \frac{\alpha_s}{\sqrt[v_s]{\gamma_s}}, \quad (14)$$

and taking the derivative of equation (13) with respect to $r_s^*$ and rearranging terms yields $$\frac{dr_s^*}{r_s^*} = -\frac{1}{v_s} \frac{d\gamma_s}{\gamma_s}. \quad (15)$$

A few observations can be made in connection with the equation (13) function. First, it may be noted that the allocated rate is proportional to $\alpha_s$. Therefore, a session with a large amount of traffic may be accommodated by assigning to it a large $\alpha_s$. Next, it may be noted (from equation (14)) that as congestion builds up in the network and $\gamma_s$ increases, the allocated session rate decreases and the change is inversely proportional to $v_s\sqrt{\gamma_s}$. The measure of increase and decrease is sensitive to the value of $v_s$. That means that two sessions that are equivalent in all other respects (and both use the incremental reward function of equation (13)), will cause their transmission rate to change differently if they are directed to use different values of $v_s$.

Realization of this fact suggests that $\tau_s$ can be used as a priority assignment to sessions. Sessions with larger $\tau_s$ are cut less severely in response to network congestion Correspondingly, a larger $\tau_s$ makes sessions less sensitive to the number of hops they must traverse in the network. It should be mentioned, perhaps, that any advantage gotten from setting $\tau_s$ at some level is only relative. If all sessions are assigned a large $\tau_s$, the congestion measures $\gamma_s$ will increase until every body is cut back to the proper usage level.

Another form for the incremental reward function, which may be quite useful for the current Internet realization, is $$h_s = h_{\max} \frac{\eta_s}{\eta_s + r_s^{v_s}}, \quad (16)$$

for some positive value of $v_s$. Here, too, $v_s$ can be used to effectively control priority, as long as $r_s^{v_s} \gg \eta_s$.

One way to look at the reason for including the $$\sum_{l=1}^{L} g_l(f^l)$$

component in equation (2) is that inclusion of this term inhibits the algorithm from driving the network links into congestion by accepting too much traffic from the sessions. This, obviously, imposes at least one condition on the cost function $g_l(f^l)$ and on its derivative, $g_l'(f^l)$. Specifically, if the desired cap on the probability of loss in a link 1, $\lambda^l$, is set to $\lambda_o^l$, then the derivative of the cost function should be such that $g_1'(f^l) = \infty$ for $f^l \geq f_o^l$. From this, it follows that $\lambda^l(f^{l*}) < \lambda_o^l$, since the cost of reaching $\lambda_o^l$ is infinite.

To illustrate, one such function may be of the form $$g_l'(f^l) = \frac{1}{(1 - f^l/f_o^l)^v}. \quad (17)$$

for some positive-valued $v$. As $v$ is decreased, $g_l'(f^l)$ becomes steeper, which on the one hand, increases the link utilization at the optimal point but, on the other hand, reduces the speed of convergence.

The incremental congestion cost of a link is specified in equation (17) as an explicit function of the link flow. Therefore, in the actual running of the algorithm, the link flow must be measured, in order for the function $g_l(f^l)$ to be evaluated. Alternatively, it is possible to use the average queue length of a link as the measurement parameter based on which the incremental congestion cost is specified. Thus, if $\eta^l$ denotes the average queue length of link 1, and $\eta_o^l$ denotes the average queue length corresponding to flow $f_o^l$ in link 1, then $g_l'(f^l)$ might advantageously be specified by:

$$g_l'(f^l) \equiv \frac{1}{(1 - \eta^l/\eta_o^l)^v}. \quad (18)$$

The congestion avoidance property discussed above, which arises from setting $g_l'(f^l) = \infty$ for $f^l = f_o^l$, hinges on the ability to specify the threshold parameters $f_o^l$ in equation (17), or $\eta_o^l$ in equation (18), based on the desired loss probability cap $\lambda_o^l$. Obviously, the relationship between these parameters depends on the statistics of the traffic passing through the link, which is not easily predictable. Therefore, the threshold parameter of choice, i.e., $f_o^l$ or $\eta_o^l$, must be specified in anticipation of likely changes in traffic statistics, such as burstiness. A main distinction between defining the incremental congestion cost directly in terms of $f^l$, or implicitly in terms of $\eta^l$, is in the sensitivity of the corresponding threshold parameter to the traffic statistics. Intuitively, it seems that $\eta_o^l$ should be less sensitive than $f_o^l$ to changes in traffic statistics, suggesting that the incremental congestion cost should be specified in terms of the average queue length.

Returning to the iterative optimization method of the MCFC algorithm, the main difficulty facing the realization of the equation (9) MCFC algorithm is the distributed computation of the congestion measures $\gamma_s$. In a network with a highly developed network layer, the task of computing congestion measures and distributing them to the corresponding sessions (or access points) can be performed by a specially designed network layer protocol, in possible cooperation with the routing protocol. In the Internet or other IP networks, realization of the MCFC algorithm is more challenging, since it needs to be carried out without explicit knowledge of the network's routing parameters and without cooperation from an IP layer.

The following discloses two realizations for the MCFC algorithm at the transport layer of an IP network: an exact realization requiring modest cooperation by network switches, and a coarse realization with no such requirement. The latter is directly applicable to the current realization of the Internet, whereas the former requires a modest enhancement to the Internet.

Exact Realization

Distributed execution of the MCFC algorithm by diverse, independent, sessions is possible if the sessions have a way of evaluating the corresponding congestion measures. There are two basic requirements for the evaluation of congestion measures, $\gamma_s$, by a session s. First, at each link 1 there must be a local capability to evaluate the incremental congestion cost $g_l'(f^l)$ on an ongoing basis. Second, there must be a way of communicating this information to the sessions traversing link 1. This is achieved by modifying the switches (or routers, or any other multiplexing points) in the Internet network to include the following capabilities:

Each switch in the network has the capability of estimating $g_l'(f^l)$ for each link originating from it. This estimation is performed on an on-going basis.

Some of the data packets traversing the network are marked by the source (or the access point) as probe packets. Each probe packet carries user data, and also includes a short congestion field to carry congestion information. A probe packet begins its journey with this field set to zero.

Each switch in the network, before forwarding a received probe packet over an outgoing link 1, increments the packet's congestion field by the current estimate of the link's incremental cost $g_l'(f^l)$.

A "switch" in the context of this disclosure, can be a router, a multiplexer, or the like.

In this manner, as a probe packet traverses the network on its way to its destination, the congestion field continues to be incremented and thereby constructs a measure of equation (6). It can be shown that for multiple-path routing arrangements, the expected value in the congestion field of the probe packet, upon arrival at the destination, is $\gamma_s$. For single-path routing arrangements, the value in the congestion field of the probe packet, upon arrival at the destination, actually corresponds to $\gamma_s$. Thus, in single-path routing arrangement, the value of a session's congestion measure at any given time can be obtained from a single probe packet. Also, for single-path routing, $r_s$ can be determined based on an identical approach; it suffices to designate a new field in each probe packet for the second derivative information and have this field be incremented by each visited switch in a similar fashion.

Ideally, one would like to see the network traffic remain stationary until the algorithm converges to its optimal point. In real network operation, however, due to quasi-static traffic changes, the optimal point is not stationary and may be viewed as a moving target that the algorithm tries to reach. Although this target may not be reached exactly, with a sufficient speed of convergence, the algorithm should be able to keep up with the pace of network changes and follow the optimal point relatively closely. Since the network traffic is an aggregation of traffic from many sources, its changes are typically slower than the dynamics of individual sessions.

In general, a distributed algorithm may be executed either synchronously, or asynchronously. In a loosely connected network such as the Internet, synchronous execution of by various sessions is not feasible. Moreover, the potential benefit of synchronous execution in terms of providing faster convergence is either minimized or totally removed by the quasi-static traffic variations.

In an asynchronous implementation, each session updates its input rate without timing coordination with other sessions. To increase the speed of convergence, the session congestion measures should be updated regularly, based on regular transmission of probe packets. Similarly, each link should update its incremental congestion cost on a regular basis. Evaluation of session congestion measures and link incremental costs should involve a limited memory span, so that the information regarding past network status is slowly forgotten and replaced by the more recent network conditions. This goal may be accomplished by updating session congestion measures and link average queue lengths by using, for example, the following exponentially weighted running averages:

$$\gamma_s \leftarrow (1-\beta_s)\gamma_s + \beta_s \cdot \gamma_s^{(p)} \quad (19)$$

and $$\eta^l \leftarrow (1-\beta^l)\eta^l + \beta^l \cdot \eta_t^l, \quad (20)$$

where $\gamma_s^{(p)}$ is the congestion field of the received probe packet, and $\eta_t^l$ is the queue length at the time t. The update of the average queue length of equation (20) is based on the presumption that the incremental link cost functions, $g_l'(f^l)$, are expressed as a function of the average queue lengths, $\eta^l$. If, instead, functions $g_l'(f^l)$ are expressed as a function of $f^l$ (e.g., equation (17)), then we should update the link flows $f^l$ rather than queue lengths $\eta^l$.

The choice of the repetition rate at which the updates in $h_s$ and $\gamma_s$ are made involves a trade-off between accurately measuring traffic conditions in the network and quickly responding to it. Conceptually, it seems desirable to apply the same repetition rate to the evaluation of link incremental costs, throughout the network. However, due to the wide range of link and session transmission rates in a diverse network such as the Internet, it may prove inevitable that different switches would be updating their $g_l'(f^l)$ estimates at different rates and the different session would update their $r_s$ and $\gamma_s$ at different frequencies.

Once a session's congestion measure is evaluated, the session's rate can be updated through $$r_s \leftarrow \max(r_s^{init}, \tilde{r}_s + \mu(h_s)(\tilde{r}_s) - \gamma_s)), \quad (21)$$

where $r_s^{init}$ is a small rate initially allocated to each new session s to enable transmission of probe packets needed for the initial evaluation of congestion measure, and $\tilde{r}_s$ is the actual utilized or attained rate. It may be noted that a session need not execute the evaluations of equations (19) and (21) with the same frequency. The congestion measure is updated each time a new probe packet is received, while the rate may be updated at the same time, or less frequently.

An alternative to explicitly updating the congestion measure through equation (19) and using it for rate updates, is to update the rate directly based on the congestion field of the received probe packets p:

$$r_s \leftarrow \max(r_s^{init}, \tilde{r}_s + \epsilon(h_s(\tilde{r}_s) - \gamma_s^{(p)})). \quad (22)$$

One can easily verify that the statistical average of the rate change in equation (22) is identical to the rate change according to equation (21), provided that the right step size $\epsilon$ is used. Although in this approach the congestion measure is not explicitly determined, updating the rate through equation (22) amounts to maintaining an implicit estimation of the congestion measure.

One realization of an algorithm comporting with the principles disclosed herein is presented in FIG. 4. Therein, in block 10 the receiving end in the session selects an initial rate, $r_s^{init}$, and that rate is set as the maximum allowable rate for the session, $r_s$. Control passes to block 11, where packets are transmitted, subject to this allowable rate $r_s$. In the course of the transmission and reception of packets, block 12 evaluates the congestion measure $\gamma_s(f)$, and block 13 evaluates the attained rate $\tilde{r}_s$. Control then passes to block 14 where the rate $r_s$ is updated per equation (21) or (22), returning control to block 11.

As stated earlier, when the session is always greedy and utilizes whatever rate is allocated to it, equation (21) or (22) may be simplified by replacing $\tilde{r}_s$ on the right hand side with $r_s$. With this simplification, block 13 in FIG. 4 can be eliminated.

It may also observed that some information is made available at the receiver end, and that some information must be communicated to the transmitter is end. Which steps of the algorithm described in FIG. 4 are taken at the receiver end is not a critical point. Illustratively, the receiver can obtain session congestion information, send that information to the transmitter, and have the transmitter end do the rest. On the other extreme, the receiver can evaluate the new $r_s$, and communicate that value to the transmitter. Obviously, each approach has different implications on the design of transport protocols, the control information that must be exchanged between the source and receiver, and the interaction between error control and congestion control.

Coarse Realization

In the absence of explicit congestion notification, the only observation a session can have about the network is through its own performance, i.e., the loss and delay of its own packets. What is needed is to select a function for $g^l(f^l)$ such that the resulting congestion measure (equation (6)), can be estimated through the available loss and delay information.

Denoting the end-to-end loss probability and the average delay of packets of session s, by $\lambda_s$, and $D_s$, respectively, and the average delay of each link l by $D_l$, it can be shown that the delay through the path taken by packets of session s can be expressed by:

$$D_s(f) = \sum_{l=1}^{L} \varphi_s^l \cdot D^l(f^l), \tag{23}$$

and that the losses in the path taken by packets of session s can be expressed by:

$$\lambda_s(f) \approx \sum_{l=1}^{L} \varphi_s^l \cdot \lambda^l(f^l), \tag{24}$$

where the approximation of equation (24) is valid as long as $\lambda_s \ll 1$. Employing equations (23) and (24) together with $g_l'(f^l)$ defined by $$g_l'(f^l) = \xi \cdot D^l(f^l) + \lambda^l(f^l), \, l=1, 2, \ldots, L, \tag{25}$$

converts equation (4) to:

$$\gamma_s(f) \approx \xi \cdot D_s(f) + \lambda_s(f). \tag{26}$$

In accordance with well known prior art techniques, a session can estimate the average delay and loss probability associated with its own transmissions and, therefore, equation (26) offers a means for estimating $\gamma_s$ from the estimates of the average delay and loss probability. The cost function specified in equation (25) meets the convexity requirement, since $D^l(f^l)$ and $\lambda^l(f^l)$ are both increasing functions of l.

While there clearly is a positive correlation between the average delay and the level of congestion on a link, average delay, in and of itself, is not indicative of congestion. Other information, such as the propagation delay and the available buffer space (or the acceptable range of queueing delays) is essential to infer the level of congestion associated with a given average delay. In contrast, the loss probability provides a more conclusive indication of the severity of congestion. This suggests that the cost function of equation (25) can be modified to merely consider probability of packet loss; i.e., modified to $$g_l'(f^l) = \lambda^l(f^l), \tag{27}$$

which converts equation (26) to:

$$\gamma_s(f) = \lambda_s(f). \tag{28}$$

Noting the caveat expressed in connection with equation (24), if a large fraction of losses is due to transmission error, as could be the case in wireless communications, link loss probability cannot be trusted as a good indicator of congestion.

The strong congestion avoidance property that came about, when the cost function was defined earlier in terms of $g_l'(f^l) = \infty$ for $f^l = f_o^l$, does not apply with link cost functions chosen in accordance with equation (27). In fact, it is easy to see that if link cost functions of equation (27) are used in conjunction with unbounded session reward functions such as in equation (13), the MCFC algorithm could drive the network into heavy congestion. If, on the other hand, the reward functions are appropriately bounded, small loss probabilities can still be guaranteed at the optimal point of the algorithm. One such incremental reward function is disclosed above in equation (16). In such an arrangement, $\gamma_s$ may be estimated using an exponentially weighted running average algorithm, whereby $\gamma_s \leftarrow (1-\beta_s)\gamma_s$ successful transmission $$\gamma_s \leftarrow (1-\beta_s)\gamma_s + \beta_s \text{ packet loss.} \tag{29}$$

In comparison to the exact realization and equation (19), this is analogous to viewing every packet, p, as a probe packet with the hypothetical congestion field $\gamma_s^{(p)}$, with is equal to 1 if p is lost and equal to 0 otherwise.

The algorithmic similarities between estimating $\gamma_s$ in the coarse and exact realizations should not obscure a fundamental difference between the two cases regarding the range of statistical fluctuations in $\gamma_s^{(p)}$ and the accuracy of estimations. For instance, in the exact realization in a network with single-path routing, one probe packet is enough to determine the congestion measure. In the coarse realization, on the other hand, the analogous parameter, $\gamma_s^{(p)}$, associated with each packet p, is either one or zero, with an average typically in the order of few percent or less. Due to the random nature of $\gamma_s^{(p)}$, a much larger number of observations is necessary before the algorithm of equation (29) converges to a reasonable estimation of the end-to-end loss probability. As a numerical example, if $\lambda_s = 0.01$, typically one out of every 100 packets is lost, implying that at least several hundred observations are needed for a meaningful estimation of $\lambda_s$. This sharp difference from the exact realization is the result of restricting information about network status to the packet losses that are locally observed.

One way to run the coarse MCFC algorithm is to update the rate via equation (21), based on explicit estimation of $\gamma_s$ obtained in equation (29). An alternative approach, like in the exact realization, is to directly update the rate, upon observing each new loss or successful transmission, by way of equation (22). In the coarse realization, due to the wide random fluctuations of $\gamma^{(p)}$, equation (22) effectively constitutes a stochastic process. A small $\epsilon$, prolongs the time necessary for the rate of new sessions to reach the final value. A large $\epsilon$, on the other hand, gives rise to large oscillations in the session rates, induced by the random fluctuations of $\gamma^{(p)}$. This difficulty can be overcome by adopting a variable step size in equation (22), i.e. adjusting $\epsilon$ as a function of iteration number, session rate, or some other parameter.

For the coarse realization, equation (22) can be restated as:

$r_s \leftarrow r_s + \alpha_s(r_s)$ successful transmission $$r_s \leftarrow \max(r_s^{init}, r_s - b_s(r_s)) \text{ packet loss,} \tag{30}$$

where $$\alpha_s(r_s) = \epsilon_s(r_s) \cdot h_s(r_s), \tag{31}$$

and $$b_s(r_s) = \epsilon_s(r_s)(1 - h_s(r_s)). \tag{32}$$

The term $\epsilon_s$ in the above equations is denoted as a function of $r_s$ in order to emphasize the possibility of changing the step size during the course of the algorithm, based on the value attained by $r_s$ (or some other criteria). According to equation (30), a session's rate must be increased by $\alpha_s(r_s)$ each time a packet is successfully transmitted, and reduced by $b_s(r_s)$ each time a packet loss is observed.

What is claimed is:

1. In a network that carries traffic of a plurality of sessions, a method, carried out by one of said sessions, comprising the steps of:

evaluating a session congestion measure that is related to congestion information on links of said network which carry incoming traffic to a receiving end of said session;

evaluating a session incremental reward function that is related to rate of said incoming traffic, and to traffic rate of no other session;

evaluating a new rate of said incoming traffic that moves said rate of said incoming traffic in a direction that minimizes a global network cost function which combines cost functions assigned to said sessions and congestion cost functions assigned to said links, where said session incremental reward function is the negative of a derivative, with respect to rate of said incoming traffic, of said one of said cost functions assigned to said sessions.

2. The method of claim 1 where said session congestion measure is a derivative, with respect to said rate of said incoming traffic, of a sum of congestion cost functions assigned to links employed by said session.

3. The method of claim 1 where said congestion cost function assigned to a link attributes a very large cost for link loads in excess of a selected threshold, chosen as maximum permissible link load.

4. The method of claim 1 where said new rate is an incremental change from said rate of said incoming traffic of said session, where the incrementing is determined based on said session incremental reward function and said session congestion measure.

5. The method of claim 1 where said step of evaluating a new rate is carried out at a receiving end of said session, and said method further comprises a step of communicating information to a sending end of said session, to change said rate of said incoming traffic towards said new rate.

6. The method of claim 1 where said step of evaluating a new rate is carried out at a sending end of said session and includes a step of receiving at said sending end results of said step of evaluating said session congestion measure.

7. The method of claim 4 where said new rate developed is an incremental change arrived at through an additive factor.

8. The method of claim 7 where said new rate, $r_s$, is determined based on an auxiliary parameter, $\hat{r}_s = r_s + \mu \cdot (h_s)(r_s) - \gamma_s(f))$, where $\mu$ is a multiplicative step size coefficient, $r_s$ is an assigned rate of incoming traffic at time of said evaluating, $h_s(r_s)$ is said session incremental reward function, and $\gamma_s(f)$ is said session congestion measure.

9. The method of claim 8 where said new rate, $r_s$, is determined by $r_s \leftarrow \hat{r}_s$ if $r_s^{init} \leq \hat{r}_s \leq r_s^d$ $r_s \leftarrow r_s^{init}$ if $\hat{r}_s \leq r_s^{init}$ $r_s \leftarrow r_s^d$ if $r_s^d \leq \hat{r}_s$, where $r_s^{init} \geq 0$.

10. The method of claim 7 where said new rate, $r_s$, corresponds to the larger of $r_s^{init}$ or $\hat{r}_s + \mu \cdot (h_s(\hat{r}_s) - \gamma_s(f))$, where $r_s^{init}$ is a given initial rate that is greater or equal to 0, $\mu$ is a multiplicative step size coefficient, $\hat{r}_s$ is an attained average rate of incoming traffic at time of said evaluating, $h_s(\hat{r}_s)$ is said session incremental reward function, and $\gamma_s(f)$ is said session congestion measure.

11. The method of claim 1 where said session incremental reward function is a positive, decreasing, function with respect to session rate.

12. In a network that carries traffic of a plurality of sessions, a method, carried out by one of said sessions, comprising the steps of:

evaluating a session congestion measure that is related to congestion information on links of said network which carry incoming traffic to a receiving end of said session;

evaluating a session incremental reward function that is related to rate of said incoming traffic, and to traffic rate of no other session;

evaluating a new rate of said incoming traffic that moves said rate of said incoming traffic in a direction that minimizes a global network cost function which combines cost functions assigned to said sessions and congestion cost functions assigned to said links where said session incremental reward function is a positive, decreasing, function with respect to session rate, starting at a minimum session rate, $r_s^{min} \geq 0$, where the incremental reward function is a very large value at $r_s = r_s^{min}$.

13. The method of claim 1 where a derivative of each of said link cost functions is a positive, increasing function with respect to rate of traffic on the link.

14. The method of claim 1 where a derivative of each of said link cost function is a positive, increasing, function of an average queue length in said link.

15. The method of claim 1 where the derivative of the congestion cost function for a link of said network is defined by $$g_l'(f^l) = \frac{1}{(1 - \eta^l / \eta_o^l)^v},$$

where $v$ is a positive constant, $f^l$ is the average traffic flow rate at link l, and $\eta^l$ is the average queue length in link l.

16. The method of claim 1 where said session incremental reward function, h, corresponds to $$\left(\frac{\alpha_s}{r_s}\right)^{v_s},$$

where $\alpha_s$ and $v_s$ are selected positive constants.

17. The method of claim 16 where different ones of said plurality of sessions employ different values of $v_s$.

18. The method of claim 16 where different ones of said plurality of sessions employ different values of $v_s$ to achieve different levels of priority.

19. The method of claim 1 where said second incremental cost, $h_s$, corresponds to $$h_{max} \frac{\eta_s}{\eta_s + r_s^{v_s}},$$

where $h_{max}$, $\eta_s$, and $v_s$ are selected constants for each of said sessions.

20. The method of claim 1 where said incoming traffic comprises packets, and all packets of said incoming traffic of said session traverse the same path that includes a given subset of links of said network.

21. The method of claim 20 where said new rate is incrementally changed from said rate of said incoming traffic of said session, where the incrementing is related to said session incremental reward function and said session congestion measure, $\gamma_s(f)$ defined by $$\gamma_s(f) = \sum_{l \in P_s} g'_l(f^l),$$

where $P_s$ is said subset of links, and $g_l'(f^l)$ is the derivative of said session congestion cost function of link l.

22. The method of claim 1 where said incoming traffic of a session comprises packets where some of said packets traverse one subset of links of said network, and at least some others of said packets traverse a different subset of links.

23. The method of claim 22 where said new rate is incrementally changed from said rate of said incoming traffic of said session, where the incrementing is related to said session incremental reward function and said session congestion measure, $\gamma_s(f)$, defined by $$\gamma_s(f) = \sum_{l=1}^{L} \varphi_s^l \cdot g'_l(f^l),$$

where $\phi_s^l$ corresponds to a fraction of said packets of said incoming traffic that flows through link l, and $g_l'(f^l)$ is the derivative of said congestion cost function of link l.

24. The method of claim 1 where said incoming traffic originates at a sending end, and said sending end includes in said incoming traffic probe packets that include at least one congestion field that is modified by network nodes through which said probe packets traverse.

25. The method of claim 24 where said probe packets are transmitted by said sending end at regular intervals.

26. The method of claim 24 where said probe packets also carry information for said receiving end.

27. The method of claim 24 where each of said nodes through which a probe packet traverses, updates a first one of said congestion fields based on a current estimate of the incremental cost, $g_l'(f^l)$, of a link through which said probe packet leaves said node.

28. The method of claim 24 where each of said nodes through which a probe packet traverses increments a first one of said congestion fields by a current estimate of the incremental cost, $g_l'(f^l)$, of a link through which said probe packet arrives at said node.

29. The method of claim 28 where each of said nodes through which a probe packet traverses modifies a second one of said congestion fields based on a current estimate of the second derivative $g_l''(f^l)$, of said session congestion function of a link through which said probe packet leaves at said node.

30. The method of claim 29 where information received at said receiving end of said session from said second one of said congestion fields is employed to control said rate of said incoming traffic.

31. The method of claim 29 where said step of evaluating said session congestion measure employs information contained in said at least one congestion field of probe packets received in said incoming traffic and in said second one of said congestion fields.

32. The method of claim 1 where said step of evaluating said session congestion measure replaces a current value of said session congestion measure, $\gamma_s$, with a new value of said session congestion measure in accordance with $\gamma_s^{new} \leftarrow (1-\beta_s)\gamma_s + \beta_s \cdot \gamma_s^{(p)}$, where $\beta_s$ is a selected constant that is less than 1, and $\gamma_s^{(p)}$ is the value of said at least one congestion field of a received probe packet.

33. The method of claim 1 where said step of evaluating said session congestion measure equates said session congestion measure to the value of said at least one congestion field of a received probe packet.

34. The method of claim 1 where said step of evaluating said session congestion measure is based on probability of packet loss experienced at said receiving end.

35. The method of claim 34 where said rate of said incoming traffic is controlled in accordance with $$r_s \leftarrow r_s + \alpha_s(r_s)$$

when there are no packets lost, and in accordance with $$r_s \leftarrow \max(r_s^{init}, r_s - b_s(r_s))$$

when there are packets lost, where $$\alpha_s(r_s) = \epsilon_s(r_s) \cdot h_s(r_s),$$

$$b_s(r_s) = \epsilon_s(r_s)(1 - h_s(r_s)), \text{ and}$$

$\epsilon_s(r_s)$ is a step size.

* * * * *